US009065248B2

(12) United States Patent
Russin

(10) Patent No.: US 9,065,248 B2
(45) Date of Patent: Jun. 23, 2015

(54) SYSTEMS AND METHODS TO MORE ACCURATELY ESTIMATE A FLUORINE CONCENTRATION IN A SOURCE LASER

(71) Applicant: Cymer, LLC, San Diego, CA (US)

(72) Inventor: Alicia Michelle Powers Russin, San Jose, CA (US)

(73) Assignee: Cymer, LLC, San Diego, CA (US)

( * ) Notice: Subject to any disclaimer, the term of this patent is extended or adjusted under 35 U.S.C. 154(b) by 86 days.

(21) Appl. No.: 14/084,916

(22) Filed: Nov. 20, 2013

(65) Prior Publication Data
US 2015/0138631 A1 May 21, 2015

(51) Int. Cl.
*H01S 3/00* (2006.01)
*H01S 3/10* (2006.01)
*H01S 3/104* (2006.01)

(52) U.S. Cl.
CPC ............. *H01S 3/10007* (2013.01); *H01S 3/104* (2013.01)

(58) Field of Classification Search
CPC ........... H01S 3/136; H01S 3/13; H01S 3/134; H01S 3/104; H01S 3/10007; H01S 3/2308
USPC .................................................. 359/333, 337
See application file for complete search history.

(56) References Cited

U.S. PATENT DOCUMENTS

| | | | |
|---|---|---|---|
| 5,440,578 A | 8/1995 | Sandstrom | |
| 5,450,436 A | 9/1995 | Mizoguchi | |
| 6,130,904 A | 10/2000 | Ishihara | |
| 6,727,731 B1 | 4/2004 | Rebhan | |
| 6,738,406 B2 | 5/2004 | Vogler | |
| 6,879,617 B2 | 4/2005 | Ariga | |
| 7,039,086 B2 | 5/2006 | Fallon | |
| 7,079,564 B2 | 7/2006 | Fallon | |
| 7,209,507 B2 | 4/2007 | Rule | |
| 7,277,464 B2 | 10/2007 | Rule | |
| 7,596,164 B2 | 9/2009 | Fallon | |
| 7,741,639 B2 | 6/2010 | Besaucele | |
| 7,835,414 B2 | 11/2010 | Dunstan | |
| 8,098,698 B2 * | 1/2012 | Dunstan et al. ............ 372/38.01 |
| 8,767,791 B2 | 7/2014 | Riggs | |
| 2005/0185690 A1* | 8/2005 | Rule et al. ........................ 372/55 |
| 2007/0013913 A1* | 1/2007 | Rafac ............................ 356/451 |
| 2008/0205472 A1 | 8/2008 | Dunstan | |

* cited by examiner

*Primary Examiner* — Mark Hellner
(74) *Attorney, Agent, or Firm* — Gard & Kaslow LLP

(57) ABSTRACT

In master oscillator-power amplifier (MOPA) systems for generating laser light, a fluorine concentration in each of the master oscillator and power amplifier chambers is maintained. While sensors at the chambers can measure certain values of some variables, the sensors do not directly measure fluorine concentration. As a further complication, the values received from the sensors are known to be affected by various specified variables. To estimate the effect on the received values, an RLS algorithm and covariance matrix are used. To ensure that the RLS algorithm is responsive to recent changes in a specified variable, portions of the covariance matrix are reset to more quickly and more heavily weight the more recent values.

15 Claims, 5 Drawing Sheets

SYSTEMS AND METHODS TO MORE ACCURATELY ESTIMATE A FLUORINE CONCENTRATION IN A SOURCE LASER

BACKGROUND

1. Field

The present invention relates generally to laser systems. More specifically, the invention relates to estimating a concentration of reactive gas into the chambers of a gas discharge laser, such as a two chamber Master Oscillator-Power Amplifier excimer laser.

2. Description of Related Art

One type of gas discharge laser used in photolithography is known as an excimer laser. An excimer laser typically uses a combination of a noble gas, such as argon, krypton, or xenon, and a reactive halogen gas such as fluorine or chlorine. The excimer laser derives its name from the fact that under the appropriate conditions of electrical stimulation and high pressure, a pseudo-molecule called an excimer (or in the case of noble gas halides, an exciplex) is created, which can only exist in an energized state and can give rise to laser light in the ultraviolet range.

Excimer lasers are widely used in high-resolution photolithography machines, and are thus one of the critical technologies required for microelectronic chip manufacturing. Current state-of-the-art lithography tools use deep ultraviolet (DUV) light from the KrF and ArF excimer lasers with nominal wavelengths of 248 and 193 nanometers respectively.

While excimer lasers may be built with a single chamber light source, the conflicting design demands for more power and reduced spectral bandwidth have meant a compromise in performance in such single chamber designs. One way of avoiding this design compromise and improving performance is by utilizing two chambers. This allows for separation of the functions of spectral bandwidth and pulse energy generation; each chamber is optimized for one of the two performance parameters.

Such dual-gas-discharge-chamber excimer lasers are often called Master Oscillator-Power Amplifier, or "MOPA," lasers. In addition to improving the spectral bandwidth and pulse energy, the efficiency of the dual chamber architecture can enable the consumable modules in MOPA lasers to reach longer operational lifetimes than their counterpart modules in single chamber light sources.

In each chamber, as the light source discharges energy across its electrodes to produce light, the halogen gas, fluorine in the case of ArF or KrF lasers, is depleted. This causes a decrease in the laser efficiency which is seen, for example, as an increase in discharge voltage required to create a given desired pulse energy. Since the discharge voltage has an upper limit determined by physical constraints of the hardware, steps must be taken to replenish the lost fluorine so that the voltage remains below this limit and the laser continues to function properly.

In order to replenish the lost fluorine, the amount of fluorine remaining in the chambers is estimated. Sensors in the MOPA system may measure a number of variables in the system but these measurements, without further refinement, are known to be inaccurate for calculating the current fluorine concentration. Various algorithms have been proposed to correct for these inaccuracies including adding a forgetting factor to the calculations to weigh more recent measurements greater than older measurements. However, in the event of a mode change, the use of the forgetting factor may delay the response of the MOPA system to the mode change.

SUMMARY

One embodiment is a method for more accurately estimating an effect of a disturbance on a measured value. The method receives values of one or more measured variables from sensors of a Master Oscillator Power Amplifier (MOPA) system. The received values are indicative of a fluorine concentration in chambers of the MOPA system. The received values are known to be affected by one or more specified variables. Then, based on a change in target bandwidth, a portion of covariance values within a covariance matrix are reset where the portion of covariance values are indicative of a first specified variable of the one or more specified variables. An effect of the one or more specified variables on the received values is estimated, using a computing device. The estimating is performed using a recursive least squares (RLS) algorithm and the covariance matrix having the reset portion of covariance values. The RLS algorithm includes a quadratic term of the first specified variable of the one or more specified variables that has a quadratic relationship with one of the one or more measured variables. An injection of fluorine into the chambers of the MOPA system is directed based on the estimated effect and the received values.

Another embodiment is a system for more accurately estimating an effect of a disturbance on a measured value. In the system is a sensor input module configured to receive values of one or more measured variables from sensors of a Master Oscillator Power Amplifier (MOPA) system. The received values are indicative of a fluorine concentration in chambers of the MOPA system and are known to be affected by one or more specified variables. A reset module is configured to reset, based on a change in target bandwidth, a portion of covariance values within a covariance matrix where the reset portion of covariance values are indicative of a first specified variable of the one or more specified variables. An adaptive filter module is configured to estimate, using a computing device, an effect of one or more specified variables on the received values. The estimating is performed using a recursive least squares (RLS) algorithm and the covariance matrix having the reset portion of covariance values. The RLS algorithm includes a quadratic term of the first specified variable of the one or more specified variables that has a quadratic relationship with one of the one or more measured variables. An injection control module is configured to direct an injection of fluorine into the chambers of the MOPA system based on the estimated effect and the received values.

A still further embodiment is a non-transitory computer-readable medium having instructions embodied thereon. When executed by a computing device, the instructions cause the computing device to perform various operations. The operations comprise receiving values of one or more measured variables from sensors of a Master Oscillator Power Amplifier (MOPA) system. The received values are indicative of a fluorine concentration in chambers of the MOPA system. The received values are known to be affected by one or more specified variables. Then, based on a change in target bandwidth, a portion of covariance values within a covariance matrix are reset where the portion of covariance values are indicative of a first specified variable of the one or more specified variables. An effect of the one or more specified variables on the received values is estimated. The estimating is performed using a recursive least squares (RLS) algorithm and the covariance matrix having the reset portion of covariance values. The RLS algorithm includes a quadratic term of the first specified variable of the one or more specified variables that has a quadratic relationship with one of the one or more measured variables. An injection of fluorine into the chambers of the MOPA system is directed based on the estimated effect and the one or more received values.

DETAILED DESCRIPTION

In Master Oscillator-Power Amplifier (MOPA) systems, fluorine is consumed in its chambers as part of the process of generating laser light. The amount of fluorine present in the chambers at any given time can then be estimated using sensors that measure variables such as timing, energy, and voltage. However, it is known that these measurements are affected by operator-specified variables such as duty cycle, energy target, and electrical current provided to a bandwidth control device of the MOPA system. To account for this, the effect of the specified variables on the measured variables is estimated using a recursive least squares (RLS) algorithm.

While some of the specified variables affect the measured variables in a linear manner, others affect the measured variables according to a quadratic relationship. For example, a current provided to a current-controlled bandwidth control device is known to have a quadratic relationship with timing variables which indicate an amount of time between ignitions in the chambers. As is known in the art, the bandwidth control device is a device that controls the bandwidth of the light produced by the MOPA system.

A covariance matrix is used as part of the RLS algorithm to estimate the effects of the specified variables on the received values of the measured variables. One issue with using a covariance matrix is that, especially towards the end of gas life of the fluorine in the chambers of the MOPA system, the covariance matrix does not adequately account for the effects due to sudden changes in the current provided to the bandwidth control device, due to the quadratic relationship. In order to more rapidly and accurately estimate these effects (also referred to as disturbances), a portion of the covariance matrix, and particularly the covariance values indicative of changes in the current provided to the bandwidth control device, is reset to a high value when the target bandwidth of the MOPA system is changed by an operator. Resetting these values biases the RLS algorithm to more quickly and more heavily weight the more recent values to adjust the current estimated relationship.

Figure 1:
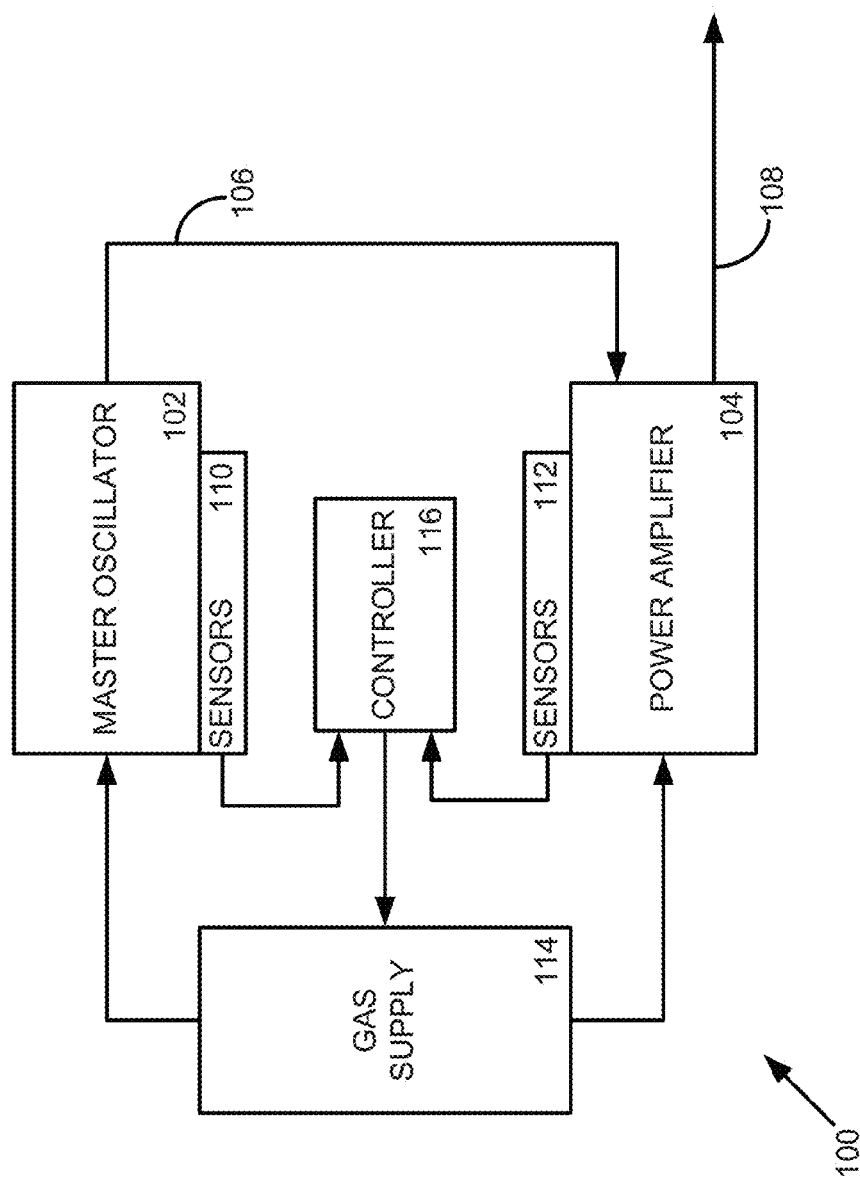
FIG. 1 is a simplified block diagram of a dual chamber gas laser, such as a MOPA system, according to one embodiment.

FIG. 1 is a simplified block diagram of a dual chamber gas laser, such as a MOPA laser 100, according to one embodiment. The MOPA laser 100 has a master oscillator 102 containing a laser chamber, and a power amplifier 104 also containing a laser chamber. In operation, the master oscillator 102 produces a first laser beam 106 which is passed to the power amplifier 104 where it is amplified, to produce an amplified laser beam 108 which is output to a scanner (not shown) for use in lithography.

Each laser chamber contains a mixture of gases; for example, in a given excimer laser each laser chamber might contain a halogen, e.g., fluorine, along with other gases such argon, neon, (commonly known as rare gases) and possibly others in different partial pressures that add up to a total pressure. For simplicity, the halogen gas is hereafter described as fluorine, although the principles described herein may be applied to other halogen gases as well.

As mentioned above, fluorine is consumed during operation of the laser. The resulting decrease in fluorine concentration typically causes a rise in the discharge voltage required to produce a laser pulse of a given power. In addition, changes in fluorine concentration also affect the delay time ("dtMOPA") between the electrical discharges that cause production of the first laser beam 106 and the amplified laser beam 108.

Thus, the fluorine concentration must be replenished by a gas supply 114 to keep the laser operating within desired parameters. Further, a satisfactory concentration of fluorine must be maintained while keeping the gas content in each laser chamber at a fixed pressure. This is sometimes done by injects, i.e., partial replenishment of the gas in the chamber, rather than a full refill in which the chamber is purged and the gas completely replaced.

Injects are typically done at fixed intervals, determined either by elapsed time between injects, or by the number of "shots," i.e., pulses of the laser, that have been generated. In some prior art systems, injects are done in each chamber after approximately every 1 million pulses by that chamber. For easier operation, the injects to the laser chambers are staggered, so that while each chamber receives an inject after about each million pulses, the power amplifier 104 receives an inject approximately 500,000 pulses after the master oscillator 102 receives an inject, and vice versa.

However, while a full refill simply replaces all of the gas in the laser chamber, an inject is intended mainly to replace the amount of fluorine that has been consumed since the last refill or inject. Since it is mostly the fluorine that is consumed during operation, it is known in the prior art that injects to the laser chambers in both the master oscillator 102 and power amplifier 104 will include a fixed amount of gases containing enough fluorine to raise the concentration of fluorine in the chamber back to a desired level, thus replacing the fluorine which has been consumed.

To determine the amount of fluorine that has been consumed, various calculations are performed by a controller 116 based on data collected by sensors 110 and 112 of the master oscillator 102 and the power amplifier 104, respectively. The controller 116 receives values from the sensors 110 and 112. In some instances, the received values include measurements that have been computed from the other received values. The received values include, for example, the amount of voltage required to produce the laser pulses, the energy of the produced laser pulses (referred to as "MO energy"), the delay time ("dtMOPA") between the electrical discharges that cause production of the first laser beam 106 and the amplified laser beam 108, and a computed peak efficiency timing value referred to as "TPeakEst".

Figure 2:
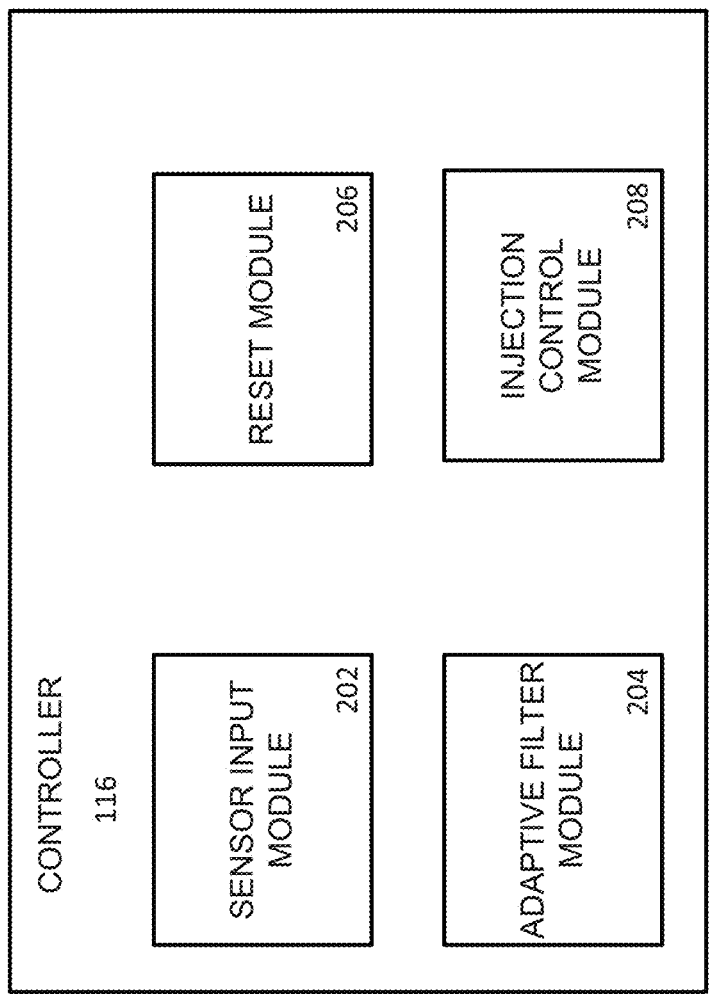
FIG. 2 is a block diagram of a controller, according to one embodiment.

FIG. 2 is a block diagram of the controller 116 according to one embodiment. The controller 116 may be implemented in a variety of ways known to those skilled in the art including, but not limited to, as a computing device having a processor with access to a memory capable of storing executable instructions. The computing device may include one or more input and output components, including components for communicating with other computing devices via a network or other form of communication. The controller 116 comprises one or more modules embodied in computing logic or executable code.

The controller 116 includes a sensor input module 202 that is configured to receive signals from the sensors 110 and 112 that are indicative of the fluorine concentration in the chambers. As described above, the sensors measure values of measured variables such as voltage, energy, and timing within the chambers. In some instances, the sensor input module 202 may perform computations on the received signals that result in the received values of the measured variables.

These measured variables, however, are not entirely accurate due to disturbances caused by settings specified by the operator of the MOPA system. The specified variables include duty cycle (DC), energy target (ET), and bandwidth target. The duty cycle (DC) is usually expressed as a percent of the time for which the laser is fired divided by the total time from the start of one burst to the start of the next burst. The energy target (ET) is the targeted laser energy. The bandwidth target is the specified width, or frequency spectrum, of the generated light. For the purposes of this disclosure, the disturbance caused by the bandwidth target is expressed as a function of an amount of current provided to a current-controlled bandwidth control device.

To adjust the values received from the sensors 110 and 112, the controller 116 includes an adaptive filter module 204 that is configured to apply an adaptive filter called a recursive least squares (RLS) algorithm to the received values. As is known in the art, a linear RLS algorithm is used to adjust the voltage and energy values received from the sensors 110 and 112.

To adjust the measured variables related to timing, a quadratic RLS algorithm is used because these variables have a quadratic relationship with the current provided to the bandwidth control device (low). The timing variables filtered using the quadratic filter are dtMOPA and TPeakEst. When the MOPA system is not being operated at an optimal timing level, the value of TPeakEst is an estimate of the optimal timing as if the MOPA system were being operated at the optimal timing level. TPeakEst is defined as:

$$TPeakEst = f(dtMOPA, Energy, C)$$

where dtMOPA is the time between discharges in the two chambers, Energy is the laser output energy and C is a calibrated constant. In some instances, TPeakEst is calculated using the equation:

$$TPeakEst = dtMOPA - \frac{MopaOpPoint}{(dMPOPdMOPA)}$$

where MopaOpPoint is the estimated slope of the discharge voltage versus dtMOPA at the target energy. When the timing is optimal, MopaOpPoint is zero and the voltage is the minimum possible voltage required to obtain the target energy output. dMPOPdMOPA is a calibrated constant that relates the slope of MopaOpPoint to dtMopa.

The quadratic RLS algorithm for TPeakEst and dtMOPA are defined according to the RLS algorithm as follows:

$$u[k] = [DC[k] \ ET[k] \ I_{BW}[k] \ I_{BW}[k]^2 \ 1]^T$$

$$K[k] = \frac{P[k-1]u[k]}{1 + u^T[k]P[k-1]u[k]}$$

$$e[k] = y[k] - w[k-1]u[k]$$

$$w[k] = w[k-1] + K^T[k]e[k]$$

$$P[k] = P[k-1] - K[k]u^T[k]P[k-1]$$

$$P[1] = \begin{bmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{bmatrix}$$

where k is a time index and u[k] is the disturbance variables written in vector form. DC[k] is the duty cycle, ET[k] is the energy target, and $I_{BW}$ is the current provided to the bandwidth control device. K[k] is a weight correction gain which determines the size of weight correction due to the estimation error. e[k] is the estimation error that is used to measure the distance between the predicted measurement and actual measurement (y[k]). w[k] is the estimated weight that determines the sensitivity of the measured signal to the disturbances. P[k] is the covariance matrix which indicates the confidence in the estimated weight. P[1] contains initial values assigned to the covariance matrix. In this instance, y[k] is a time-averaged value minus a reference value of TPeakEst or dtMopa and u[k] contains time-averaged minus reference disturbance values.

The controller 116 includes a reset module 206 that is configured to reset a portion of the values in the covariance matrix, P[k], to their initial values upon a change in target bandwidth. More specifically, the MOPA system 100 can operate in a focus drilling (FD) mode which has a higher bandwidth target than non-FD modes. As is known in the art, FD mode uses a broader bandwidth of light thus leading to a higher depth of focus in lithography. As is known in the art, to enter the FD mode from a non-FD mode, the current provided to the bandwidth control device ($I_{BW}$) is nearly instantaneously switched from a lower current to a higher current. Similarly, bandwidth target changes triggered by entering and exiting the FD mode are when large changes in $I_{BW}$ value are expected.

At the beginning of a refill, the covariance matrix P[k] is large, meaning that the confidence in the weight values is low because no data has been collected and the weights are likely inaccurate. As the number of measured data points increases, the P[k] matrix decreases in value since the confidence in the weight values increases. While this is reasonable under general steady state conditions, it also implies that changes the $I_{BW}$ value that happen towards the later portion of the gas life are not given as much significance as the changes during the beginning portion. This could result in the weights w[k], especially the quadratic weight, not taking advantage of a recently-changed $I_{BW}$ current to update the weights in w[k] to more accurate values. In an effort to lend more significance to the measurements directly after a change in bandwidth target, the elements in the P matrix corresponding to the $I_{BW}$ measurements are reset, by the reset module 206, to the high value used for initialization.

The reset P[k] matrix is:

$$P[k] = \begin{bmatrix} P_{11} & P_{12} & P_{13} & P_{14} & P_{15} \\ P_{21} & P_{22} & P_{23} & P_{24} & P_{25} \\ P_{31} & P_{32} & 1 & P_{34} & P_{35} \\ P_{41} & P_{42} & P_{43} & 1 & P_{45} \\ P_{51} & P_{52} & P_{53} & P_{54} & P_{55} \end{bmatrix}$$

The condition to reset the covariance matrix is expressed as:

IF bandwidth$E$95Target[$k$]≠bandwidth$E$95Target[$k-1$]

where, as is known in the art, the bandwidthE95Target is a target bandwidth metric that calculates the bandwidth of the generated light using 95% of the area under a bandwidth curve. The change in the bandwidthE95Target value results in a change in the $I_{BW}$.

The reset P[k] matrix is then used to estimate the effect of the specified values on the received values of the measurement variables. As discussed above, the estimated effect is calculated using the RLS algorithm and is based on the received values of the measured variables.

The controller 116 includes an injection control module 208 that directs an injection of fluorine into the chambers of the MOPA system based on the estimated effect calculated by the RLS algorithm and on the received values of the measured variables, as is known in the art. As stated previously, in some prior art systems each chamber is allowed the opportunity to receive an inject every 1 million pulses. When the inject opportunity arises, a fixed quantity of noble gas is injected while the quantity if halogen gas (Fluorine) is computed based on the received values adjusted by the RLS estimated effects of the specified variables on the received values. Each chamber uses different measured variables and contains its own RLS model to determine the size of the inject at each opportunity The following figures depict the comparative results of using various methods to calculate the estimated effects in a higher bandwidth mode (e.g., a focus drilling (FD) mode) and in a lower bandwidth mode (e.g., a non-FD mode). In the FD mode, the current provided to the bandwidth control device is higher, typically in the range of 10 milliAmps (mA) to 15 mA or 20 mA. In the non-FD mode, the current provided to the bandwidth control device is lower, typically between 4.5 mA and 5.0 mA. Two types of tests were used while keeping the duty cycle (DC) and energy target (ET) specified variables constant at 40% and 10 milliJoules (mJ), respectively. In the first test, the estimated effect was calculated for various current levels within the focus drilling mode. In the second test, the current was switched between the non-focus drilling mode and the focus drilling mode.

Figure 3:
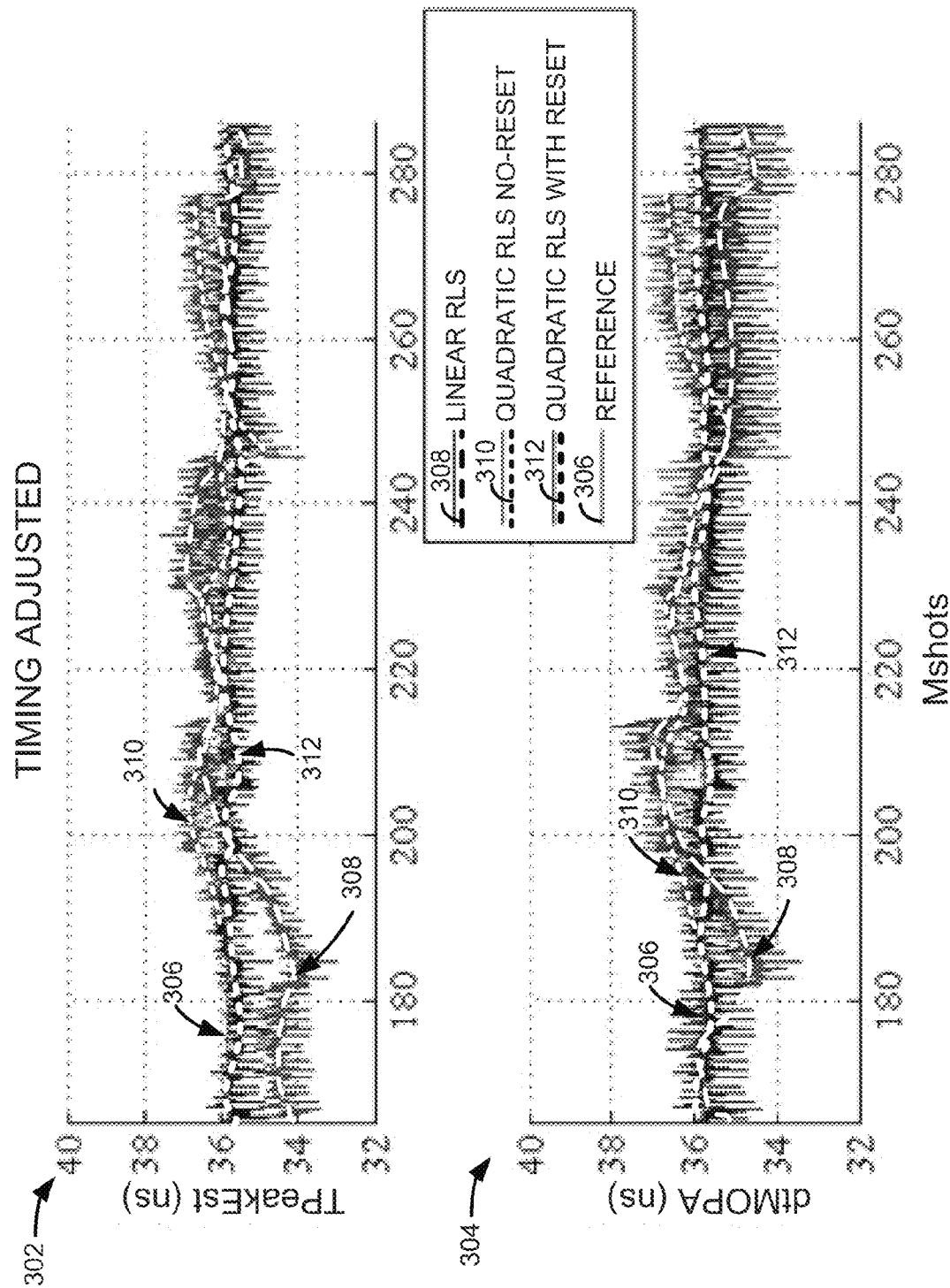
FIG. 3 depicts the results of a first test where the MOPA system remains in a higher bandwidth mode.

The results of the first test are depicted in FIG. 3, where the current provided to the bandwidth control device was controlled so as to operate at various levels within the higher bandwidth mode. As will be explained, resetting of the portion of the covariance matrix leads to a more accurate estimate of the effect of a change in target bandwidth on timing in the chambers of the MOPA system. In FIG. 3, three methods for calculating the effect on each of the two timing variables are depicted for comparison against a reference. In an ideal system, the estimate would follow the reference. Three trendlines are added to each line graph to better aid the reader in interpreting the line graph and following the general trend of each dataset.

Specifically, line graph 302 depicts the estimated effect on the timing variable TPeakEst as a function of the number of pulses generated (labeled "Mshots" or one million laser pulses). Line graph 304 depicts the estimated effect on the timing variable dtMOPA as a function of the number of pulses generated ("Mshots"). In each of the line graphs 302 and 304, the reference is depicted as a horizontal line just below a 36 nanosecond (ns) hash mark on the y-axis. A first trendline 308 depicts the estimated effect on the timing variables using a linear (non-quadratic) RLS algorithm. As can be seen, this trendline 308 crosses the reference 306 multiple times in an erratic manner. A second trendline 310 depicts the estimated effect on the timing variables using the quadratic RLS algorithm. While the trendline 310 more closely follows the reference 306, at about 260 Mshots (later in the gas life), it jumps across the reference 306 and continues to increase. The third trendline 312 depicts the estimated effect on the timing variables using the quadratic RLS algorithm and incorporating the reset of the covariance matrix, as discussed above. As shown, the third trendline 312 most closely follows the reference 306.

Figure 4:
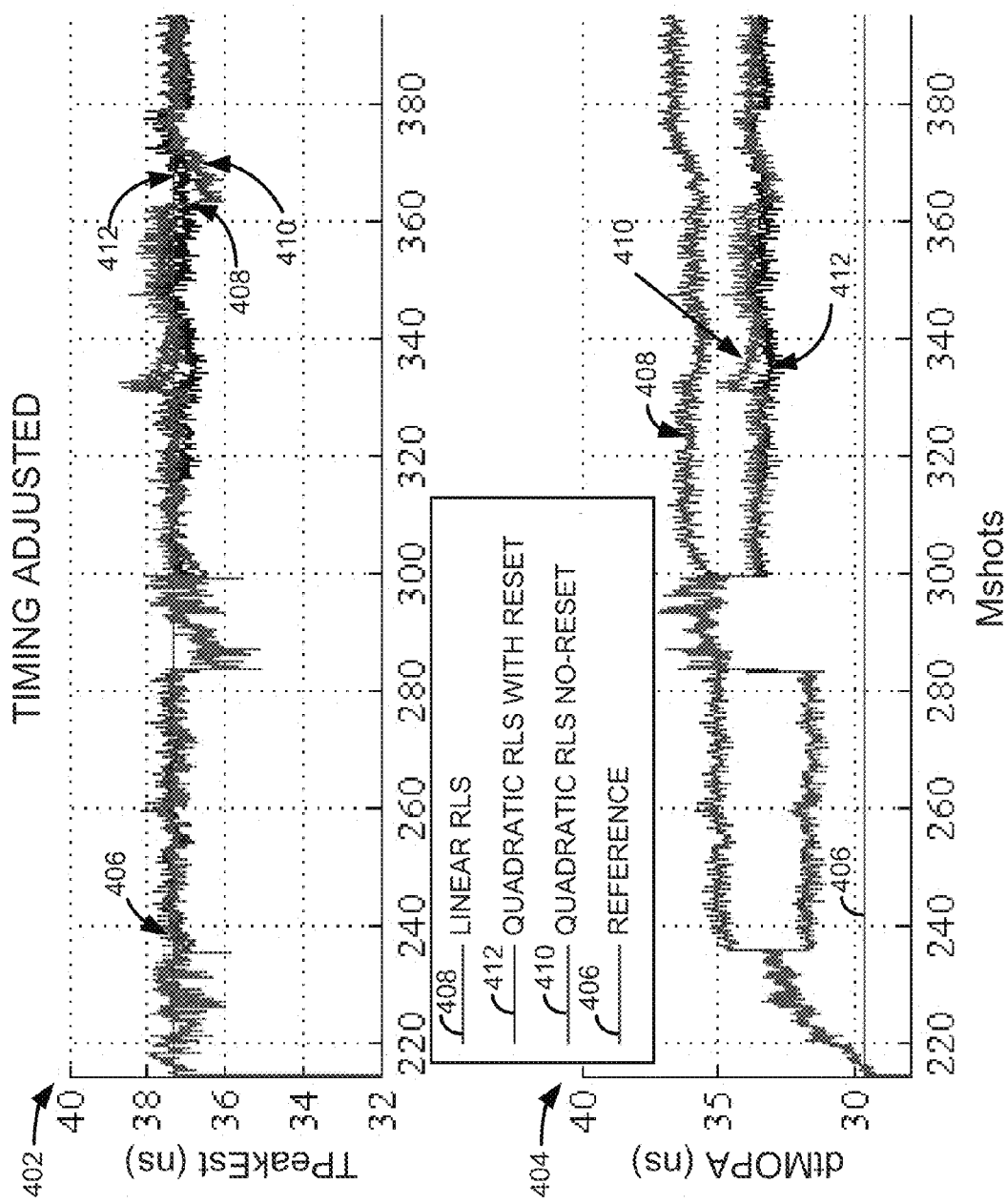
FIG. 4 depicts the results of a second test where the MOPA system switches between a higher bandwidth mode and a lower bandwidth mode.

The results of the second test are depicted in FIG. 4, where the current provided to the bandwidth control device was varied so as to switch between the higher bandwidth mode and the lower bandwidth mode. In the second test, the MOPA system 100 switched from a non-FD mode (lower bandwidth) to the FD mode (higher bandwidth) just before 240 Mshots. The MOPA system 100 switched back to the non-FD mode just after 280 Mshots before returning to the FD mode at approximately 300 Mshots.

FIG. 4 depicts the same two line graphs depicted in FIG. 3. The line graph 402 illustrates the estimated effect on the timing variable TPeakEst using the same three methods of FIG. 3. While each of the three methods indicate some response to the mode change when estimating the effect of TPeakEst in line graph 402, (between the focus drilling and non-focus drilling modes between Mshots 280 and 300), the trendlines 408 and 410 for the linear RLS and the quadratic RLS without a reset, respectively, veer further away from the reference 406 than the third trendline 412 as can be seen in FIG. 4 after 360 Mshots. Similarly, in line graph 404, depicting the estimated effect on the timing variable dtMOPA, the trendline of linear RLS algorithm 408 varies most from the reference 406 and particularly after the first mode change before 240 Mshots. The trendline 410 (quadratic RLS with no reset) fared better but not as well as the trendline 412, particularly in the second half of the line graph 404, after 320 Mshots. As depicted, the quadratic values with reset 412 are less reactive to changes in $I_{BW}$, and therefore target bandwidth, that occur later in the gas life.

Figure 5:
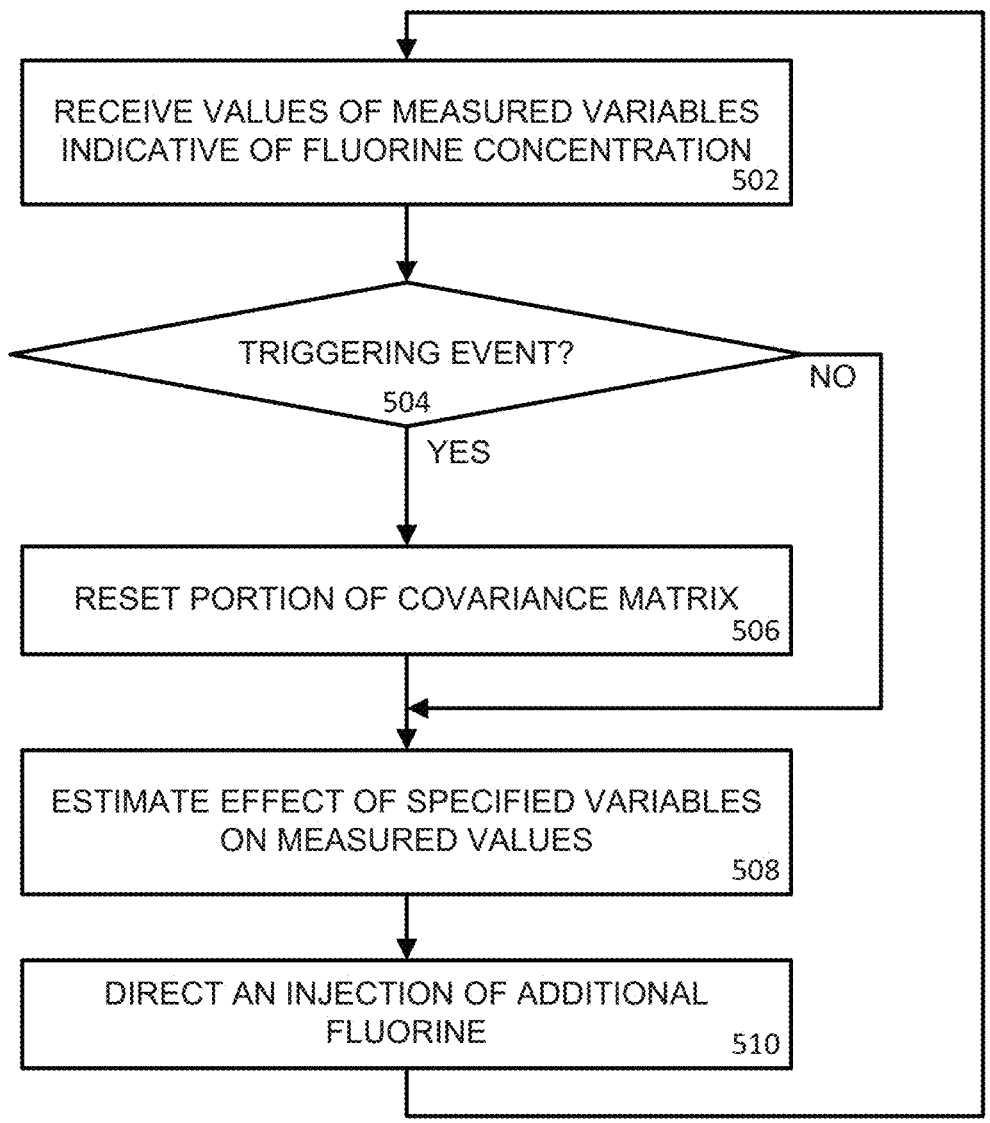
FIG. 5 is a flowchart of a method to more accurately estimate an effect of specified variables on received values, according to one embodiment.

FIG. 5 is a flowchart depicting the various operations that may be performed to estimate an effect of specified variables on received values, according to one embodiment. In some embodiments, these operations are performed by the controller 116.

In an operation 502, the values of the measured variables are received. The received values are indicative of the fluorine concentration in the chambers 102 and 104 of the MOPA system 100. The values of these measured variables include ignition voltage, energy generated, and timing. The operation 502 can be performed by the sensor input module 202.

In an operation 504, a determination is made as to whether a triggering event such as a change in target bandwidth has occurred. In some instances, the change in target bandwidth may be due to switching between an FD mode and a non-FD mode. The target bandwidth may be changed by changing an amount of current provided to the bandwidth control device. In some instances, the determination is made based on a setting provided by an operator of the MOPA system 100 or based upon detecting a change in the current provided to the bandwidth control device. The operation 504 can be performed by the reset module 206.

In an operation 506, if a triggering event was determined to have occurred, a portion of the values in the covariance matrix are reset. These values correspond to the covariance of a first specified variable of the one or more specified variables. In some instances, the first specified variable is the current provided to the bandwidth control device. The values are reset to a high value (e.g., 1) thus indicating a low confidence in previous values. The operation 506 can be performed by the reset module 206.

In an operation 508, regardless of whether a triggering event has occurred, the effects of the specified variables on the received values are estimated. The estimation is performed using the RLS algorithm and, as part of the RLS algorithm, the covariance matrix. For the received values of measured variables having a linear relationship with the specified values, a linear RLS algorithm is used, as is known in the art. For the received values of the measured variables having a quadratic relationship with the specified variables, a quadratic RLS algorithm is used. In particular, measured variables indicative of the timing in the MOPA system 100 have a quadratic relationship with the specified variables. The operation 508 can be performed by the adaptive filter module 204.

In an operation 510, an injection of additional fluorine into the chambers 104 and 106 is directed based on the estimated effect of the specified variables. The process of directing an injection using known values can be performed using any one of a variety of techniques known in the art. The operation 510 can be performed by the injection control module 208.

The disclosed method and apparatus has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than those described above. For example, different algorithms and/or logic circuits, perhaps more complex than those described herein, may be used, as well as possibly different types of MOPA systems.

Further, it should also be appreciated that the described method and apparatus can be implemented in numerous ways, including as a process, an apparatus, or a system. The methods described herein may be implemented by program instructions for instructing a processor to perform such methods, and such instructions recorded on a computer readable storage medium such as a hard disk drive, floppy disk, optical disc such as a compact disc (CD) or digital versatile disc (DVD), flash memory, etc., or over a computer network wherein the program instructions are sent over optical or electronic communication links. It should be noted that the order of the steps of the methods described herein may be altered and still be within the scope of the disclosure.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method comprising:
receiving values of one or more measured variables from sensors of a Master Oscillator Power Amplifier (MOPA) system, the received values indicative of a fluorine concentration in chambers of the MOPA system, the received values affected by one or more specified variables;
resetting, based on a change in target bandwidth, a portion of covariance values within a covariance matrix, the portion of covariance values indicative of a first specified variable of the one or more specified variables;
estimating, using a computing device, an effect of the one or more specified variables on the received values, the estimating performed using a recursive least squares (RLS) algorithm and the covariance matrix having the reset portion of covariance values, the RLS algorithm including a quadratic term of the first specified variable of the one or more specified variables that has a quadratic relationship with one of the one or more measured variables; and
directing an injection of fluorine into the chambers of the MOPA system based on the estimated effect and the received values.

2. The method of claim 1, wherein a second specified variable of the one or more specified variables has a linear relationship with the measured variables.

3. The method of claim 1, wherein the specified variables comprise: duty cycle, energy target, and current provided to a bandwidth control device of the MOPA system.

4. The method of claim 1, wherein the change in target bandwidth is due to the MOPA system entering a focus drilling mode.

5. The method of claim 1, wherein the first specified variable is a timing variable.

6. The method of claim 5, wherein the timing variable is a computed peak efficiency timing value or an amount of time between a first ignition in the first chamber of the chambers of the MOPA system and a second ignition in a second chamber of the chambers of the MOPA system.

7. The method of claim 1, wherein the first specified variable of the one or more specified variables is an amount of current provided to a bandwidth control device of the MOPA system.

8. A system comprising:
a sensor input module configured to receive values of one or more measured variables from sensors of a Master Oscillator Power Amplifier (MOPA) system, the received values indicative of a fluorine concentration in chambers of the MOPA system, the received values affected by one or more specified variables;
a reset module configured to reset, based on a change in target bandwidth, a portion of covariance values within a covariance matrix, the portion of covariance values indicative of a first specified variable of the one or more specified variables; and
an adaptive filter module configured to estimate, using a computing device, an effect of one or more specified variables on the received values, the estimating performed using a recursive least squares (RLS) algorithm and the covariance matrix having the reset portion of covariance values, the RLS algorithm including a quadratic term of the first specified variable of the one or more specified variables that has a quadratic relationship with one of the one or more measured variables; and an injection control module configured to direct an injection of fluorine into the chambers of the MOPA system based on the estimated effect and the received values.

9. The system of claim 8, wherein a second specified variable of the one or more specified variables has a linear relationship with the measured variables.

10. The system of claim 8, wherein the specified variables comprise: duty cycle, energy target, and current provided to a bandwidth control device of the MOPA system.

11. The system of claim 8, wherein the change in target bandwidth is due to the MOPA system entering a focus drilling mode.

12. The system of claim 8, wherein the first specified variable is a timing variable.

13. The system of claim 12, wherein the timing variable is a computed peak efficiency timing value or an amount of time between a first ignition in the first chamber of the chambers of the MOPA system and a second ignition in a second chamber of the chambers of the MOPA system.

14. The system of claim 8, wherein the first specified variable of the one or more specified variables is an amount of current provided to a bandwidth control device of the MOPA system.

15. A non-transitory computer-readable medium having instructions embodied thereon, the instructions executable by a computing device to perform operations comprising:

receiving values of one or more measured variables from sensors of a Master Oscillator Power Amplifier (MOPA) system, the received values indicative of a fluorine concentration in chambers of the MOPA system, the received values affected by one or more specified variables;

resetting, based on a change in target bandwidth, a portion of covariance values within a covariance matrix, the portion of covariance values indicative of a first specified variable of the one or more specified variables;

estimating, using a computing device, an effect of the one or more specified variables on the received values, the estimating performed using a recursive least squares (RLS) algorithm and the covariance matrix having the reset portion of covariance values, the RLS algorithm including a quadratic term of the first specified variable of the one or more specified variables that has a quadratic relationship with one of the one or more measured variables; and directing an injection of fluorine into the chambers of the MOPA system based on the estimated effect and the received values.

* * * * *